United States Patent [19]

Iwamoto et al.

[11] Patent Number: 6,037,416
[45] Date of Patent: Mar. 14, 2000

[54] THERMOSETTING COATING COMPOSITION

[75] Inventors: Akio Iwamoto; Takeshi Kato; Shinobu Fujie; Kazuhiko Hotta; Kunio Iwase; Hiroshi Takeuchi, all of Nagoya, Japan

[73] Assignee: Mitsubishi Rayon Co., Ltd., Tokyo, Japan

[21] Appl. No.: 09/011,062

[22] PCT Filed: Aug. 10, 1995

[86] PCT No.: PCT/JP95/01604

§ 371 Date: Feb. 10, 1998

§ 102(e) Date: Feb. 10, 1998

[87] PCT Pub. No.: WO97/06216

PCT Pub. Date: Feb. 20, 1997

[51] Int. Cl.$^7$ .............................. C08L 33/14; C08L 25/14
[52] U.S. Cl. .............................................. 525/207; 525/208
[58] Field of Search ...................................... 525/207, 208

[56] References Cited

U.S. PATENT DOCUMENTS 5,270,392  12/1993  Okude et al. .
5,374,682  12/1994  Gouda et al. .
5,508,352   4/1996  Sasaki et al. ........................ 525/207

FOREIGN PATENT DOCUMENTS 0 257 513   3/1988   European Pat. Off. .
63-84674    4/1988   Japan .
1-139653    6/1989   Japan .
3-287650   12/1991   Japan .
4-363374   12/1992   Japan .

*Primary Examiner*—Robert Dawson
*Assistant Examiner*—D. Aylward
*Attorney, Agent, or Firm*—Oblon, Spivak, McClelland, Maier & Neustadt, P.C.

[57] ABSTRACT

A thermosetting coating composition comprising an acrylic copolymer (A) containing vinyl monomer units each having an $\alpha,\beta$-dicarboxylic acid anhydride group and vinyl monomer units each having an $\alpha,\beta$-dicarboxylic monoester group in a total amount of 5–40 wt % and containing the vinyl monomer units with $\alpha,\beta$-dicarboxylic acid anhydride groups at 0.3–5 wt %, and an acrylic copolymer (B) with epoxy groups.

11 Claims, No Drawings

THERMOSETTING COATING COMPOSITION

TECHNICAL FIELD

The present invention relates to a thermosetting coating composition which is effective as a top clear coating for automobiles and the like for which attractiveness and a good coating performance are demanded.

BACKGROUND ART

Acryl/melamine-based resins have been widely used as automotive top clear coatings because of their excellent performance in terms of weather resistance and attractiveness. However, acryl/melamine-based resins have poor acid resistance because they employ melamine resins as curing agents and, when applied as paints the coatings become stained by acidic rain, thus impairing the appearance.

In order to overcome this problem, new curing systems have been desired to replace melamine and therefore much research is being carried out on curing systems which utilize crosslinking reactions between acid groups and epoxy groups. For example, in Japanese Unexamined Patent Publication No. 63-84674 there is proposed a high solid-content curing composition which contains a low molecular weight polyepoxide, a low molecular weight hydroxyl group-containing polyfunctional substance, a crosslinking agent comprising an acid anhydride, and a curing catalyst, as a paint composition with excellent adhesion, luster and sharpness. Also, Japanese Unexamined Patent Publication No. 1-139653 proposes a thermosetting solvent-type coating composition which comprises an acrylic copolymer with acid groups and an acrylic copolymer with epoxy groups, as a coating composition with excellent acid resistance, solvent resistance, moisture resistance and coating appearance.

Nevertheless, the use of crosslinking agents containing acid anhydrides as disclosed in Japanese Unexamined Patent Publication No. 63-84674 is associated with problems in that the increased reactivity between the composition components results in poor storage stability, thus making it difficult to use the composition components in a single solution and reducing handleability. Also, thermosetting solvent-type coating compositions such as disclosed in Japanese Unexamined Patent Publication No. 1-139653 have poor low-temperature curing properties, and thus when baked at the relatively low temperatures employed in automobile baking lines, they have the disadvantage of exhibiting inadequate coating performance, including poor crack resistance, poor acid resistance and poor solvent resistance, in temperature variable environments.

For the purpose of solving these problems, Japanese Unexamined Patent Publication Nos. 2-45577, 3-287650 and 4-363374 have proposed thermosetting compositions containing copolymers with acid anhydride groups in the form of half-esters as the acid groups, with hydroxy compounds and epoxy compounds, as well as thermosetting compositions containing copolymers with acid anhydride groups in the form of half-esters as acid groups, and compounds with epoxy groups and hydroxy groups. However, since these thermosetting compositions have high contents of monomer units with half-esterified acid anhydride groups, they are still unsatisfactory from the standpoint of storage stability, while their lack of monomer units with acid anhydride groups presents the same disadvantage of insufficient low-temperature curing properties and poor solvent resistance.

DISCLOSURE OF THE INVENTION

It is an object of the present invention to provide a thermosetting coating composition with excellent storage stability and low-temperature curing properties, as well as superior coating performance as represented by its solvent resistance, acid resistance, scratch resistance, weatherability and attractiveness.

The present inventors have completed the invention as a result of diligent research on thermosetting coating compositions in consideration of the aforementioned problems associated with the prior art.

Specifically, the thermosetting coating composition of the present invention comprises an acrylic copolymer (A) containing vinyl monomer units each having an $\alpha,\beta$-dicarboxylic acid anhydride group and vinyl monomer units each having an $\alpha,\beta$-dicarboxylic monoester group in a total amount of 5–40 wt % and containing the vinyl monomer units with $\alpha,\beta$-dicarboxylic acid anhydride groups at 0.3–5 wt %, and an acrylic copolymer (B) with epoxy groups.

In addition, the inclusion of specific monomer units in the acrylic copolymer (A) and acrylic copolymer (B) mentioned below in the composition of the invention provides further improvement in the coating performance including acid resistance, solvent resistance and weatherability.

Also, when the thermosetting coating composition of the invention is used as a clear coating in combination with specific base coatings to be described later, a vast improvement in attractiveness is achieved compared to the use of acrylic/melamine-based coatings of the prior art.

The composition of the invention also has the feature of vastly improving the non-sand recoating property as a coating, by addition of a hydroxy group-containing polymer (E) to be specified later.

BEST MODE FOR CARRYING OUT THE INVENTION

The acrylic copolymer (A) used for the thermosetting coating composition of the invention is obtained either by polymerization of a polymerizable monomer mixture comprising a dicarboxylic monoester group-containing vinyl monomer and an $\alpha,\beta$-dicarboxylic acid anhydride group-containing vinyl monomer, or by polymerization of a polymerizable monomer mixture containing an $\alpha,\beta$-dicarboxylic acid anhydride group-containing monomer, followed by partial ring opening of the acid anhydride groups with an alcohol and monoesterification, and contains the $\alpha,\beta$-dicarboxylic acid anhydride group-containing vinyl monomer units and dicarboxylic monoester group-containing vinyl monomer units, as a total, in the range of 5–40 wt %.

If the total of these monomer units is less than 5 wt %, the curing property will be insufficient, tending to lower the coating hardness and solvent resistance, while if it is greater than 40 wt % the storage stability of the thermosetting coating composition will be reduced. The total of the monomer units is preferably in the range of 10–30 wt %.

Also, it is necessary for the vinyl monomer unit with an $\alpha,\beta$-dicarboxylic acid anhydride group to be present in a range of 0.3–5 wt %. At less than 0.3 wt % of the vinyl monomer unit with an acid anhydride group, the low-temperature curing property will be inadequate, and at greater than 5 wt % the storage stability of the thermosetting coating composition will be reduced. The content of this monomer unit is preferably 0.5—3 wt %.

The acrylic copolymer (A) to be used according to the invention preferably has an acid value (number of mg of potassium hydroxide required to neutralize 1 g of the acrylic copolymer) of 50–150 mgKOH/g, and a weight average molecular weight of 2,000–30,000. If the acid value of the acrylic copolymer (A) is less than 50 mgKOH/g, the curing property may be insufficient, tending to lower the coating hardness and solvent resistance, while if it is greater than 150 mgKOH/g the viscosity of the copolymer may be notably increased, and the luster, moisture resistance and weatherability resistance of the coating will tend to fall. This value is more preferably in the range of 70–130 mgKOH/g. Also, if the weight average molecular weight of the acrylic copolymer (A) is less than 2,000, the moisture resistance and weatherability of the coating may tend to be lower, while if it exceeds 30,000 the viscosity of the resin may be notably increased, tending to reduce the attractiveness of the coating and the storage stability of the coating composition. This value is more preferably in the range of 3,000–20,000.

As specific examples of vinyl monomers with $\alpha,\beta$-dicarboxylic acid anhydride groups to be used for acrylic copolymer (A) there may be mentioned maleic anhydride, itaconic anhydride, citraconic anhydride and 2,3-dimethylmaleic anhydride, and as vinyl monomers with dicarboxylic monoester groups there may be mentioned monomethyl maleate, monoethyl maleate, monobutyl maleate, monooctyl maleate, monooctyl itaconate, monobutyl fumarate, mono-2-ethylhexyl fumarate and monoethyl citraconate.

As additional vinyl monomers to be used for acrylic copolymer (A) there may be mentioned, for example, (meth)acrylic esters with hydrocarbon substituents such as methyl (meth)acrylate (This expression used here and throughout includes both methyl acrylate and methyl methacrylate.), ethyl (meth)acrylate, n-propyl (meth)acrylate, n-butyl (meth)acrylate, i-butyl (meth)acrylate, t-butyl (meth)acrylate, sec-butyl (meth)acrylate, n-pentyl (meth)acrylate, lauryl (meth)acrylate, tridecyl (meth)acrylate, decyl (meth)acrylate, stearyl (meth)acrylate, 2-ethylhexyl (meth)acrylate, cyclohexyl (meth)acrylate, norbornyl (meth)acrylate, isobornyl (meth)acrylate and dicyclopentanyl (meth)acrylate; styrene derivatives such as styrene, vinyltoluene and $\alpha$-methylstyrene; ethylenic unsaturated nitrile compounds such as acrylonitrile and methacrylonitrile; N-alkoxy-substituted amides such as N-methoxymethyl acrylamide, N-ethoxymethyl acrylamide and N-butoxymethyl acrylamide; vinyl basic monomers such as dimethylaminoethyl (meth)acrylate and diethylaminoethyl (meth)acrylate; epoxy group-containing monomers such as glycidyl (meth)acrylate, methylglycidyl (meth)acrylate, 3,4-epoxycyclohexyl (meth)acrylate and allylglycidyl ether; carboxyl group-containing $\alpha,\beta$-unsaturated vinylic monomers such as methacrylic acid, acrylic acid, crotonic acid, vinylbenzoic acid, fumaric acid, itaconic acid and maleic acid; and long-chain carboxyl group-containing vinyl monomers, including half-esterified reaction products of acid anhydride compounds and caprolactone-modified hydroxyl group-containing (meth)acrylic acid esters such as succinic acid monoesters obtained by esterification of the terminal hydroxyl group of a $\epsilon$-caprolactone or $\gamma$-buytrolactone ring-opening addition product to 2-hydroxyethyl (meth)acrylate, $\beta$-carboxyethyl (meth)acrylate, $\beta$-(meth)acryloxyethyl acid succinate, $\beta$-(meth)acryloxyethyl acid maleate, $\beta$-(meth)acryloxyethyl acid phthalate, $\beta$-(meth)acryloxyethyl hexahydrophthalate, $\gamma$-(meth)acryloxypropyl acid succinate or 2-hydroxyethyl (meth)acrylate with succinic anhydride to introduce a terminal carboxyl group, and phthalic acid monoesters and hexahydrophthalic anhydride monoesters obtained by esterification of the terminal hydroxyl group of a $\epsilon$-caprolactone or $\gamma$-buytrolactone ring-opening addition product (for example, Placcel F monomer by Daicel Chemicals, KK. or Tone M monomer by UCC Co.) to 2-hydroxyethyl (meth)acrylate with phthalic anhydride or hexahydrophthalic anhydride. These may be used either alone or in combinations of two or more as necessary, but the various characteristics including coating hardness, acid resistance, weather resistance and solvent resistance can be further improved by using (meth)acrylic acid ester monomers with alicyclic hydrocarbon substituents such as cyclohexyl (meth)acrylate, norbornyl (meth)acrylate, isobornyl (meth)acrylate and dicyclopentanyl (meth)acrylate, and adding them as monomer units in the acrylic copolymer (A) to an amount of 10–70 wt %. In this case, it is undesirable for the (meth)acrylic acid ester monomer unit with the alicyclic hydrocarbon substituent to be present at less than 10 wt % as this may result in an unsatisfactory effect of improvement in the various characteristics, or greater than 70 wt % as this may cause the coating to become brittle, tending to lower the weather resistance and non-sand recoating property of the coating. The amount is more preferably in the range of 20–60 wt %.

According to the invention, by inclusion of the aforementioned $\alpha,\beta$-dicarboxylic acid anhydride group or dicarboxylic acid monoester group with the long-chain carboxylic group and epoxy group in the acrylic copolymer (A), it is possible to increase the reactivity of the coating composition without impairing its storage stability, thus improving its low-temperature curing property as well as the scratch resistance, solvent resistance and the hardness of the resulting coating. In this case, the acid value of the acrylic copolymer (A) is preferably 50–150 mgKOH/g as mentioned earlier, and the epoxy equivalent value (number of grams of resin containing 1 gram equivalent of epoxy groups) is preferably 2,000 g/eq or greater. If the epoxy equivalent value of the acrylic copolymer (A) is less than 2,000 g/eq, the thermosetting covering composition may become thickened and prone to gelation, while gelation may also tend to occur during synthesis of the acrylic copolymer (A).

The acrylic copolymer (B) to be used in the thermosetting coating composition of the invention is obtained by copolymerization of a vinyl monomer with epoxy groups.

As epoxy-containing vinyl monomers to be used for acrylic copolymer (B) there may be mentioned, for example, glycidyl (meth)acrylate, methylglycidyl (meth)acrylate, 3,4-epoxycyclohexyl (meth)acrylate and allylglycidyl ether, which may be used alone or in combinations of 2 or more as necessary. The amount of the epoxy-containing monomer used is preferably in a range of 200–1,500 g/eq in terms of epoxy equivalents of the acrylic copolymer (B), and for example it may be in the range of 15–60 wt %, or more preferably in the range of 20–50 wt %.

As additional vinyl monomers to be used for acrylic copolymer (B) there may be mentioned, for example, (meth)acrylic esters with hydrocarbon substituents such as methyl (meth)acrylate, ethyl (meth)acrylate, n-propyl (meth)acrylate, n-butyl (meth)acrylate, i-butyl (meth)acrylate, t-butyl (meth)acrylate, sec-butyl (meth)acrylate, n-pentyl (meth)acrylate, lauryl (meth)acrylate, tridecyl (meth)acrylate, decyl (meth)acrylate, stearyl (meth)acrylate, 2-ethylhexyl (meth)acrylate, cyclohexyl (meth)acrylate, norbornyl (meth)acrylate, isobornyl (meth)acrylate and dicyclopentanyl (meth)acrylate; styrene derivatives such as styrene, vinyltoluene and a-methylstyrene; ethylenic unsaturated nitrile compounds such as acrylonitrile and methacrylonitrile; N-alkoxy-substituted amides such as N-methoxymethyl acrylamide, N-ethoxymethyl acrylamide and N-butoxymethyl acrylamide; basic vinyl monomers such as dimethylaminoethyl (meth)acrylate and diethylaminoethyl (meth)acrylate; hydroxyalkyl group-containing (meth)acrylic acid esters such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate and 6-hydroxyhexyl (meth) acrylate; γ-butyrolactone ring-opening addition products to 2-hydroxyethyl methacrylate; ε-caprolactone ring-opening addition products to 2-hydroxyethyl acrylate; ethylene oxide ring-opening addition products to methacrylic acid; propylene oxide ring-opening addition products to methacrylic acid; (meth)acrylic acid esters with terminal hydroxyl groups, such as 2-hydroxyethyl (meth)acrylate or 2-hydroxypropyl (meth)acrylate dimers or trimers; other hydroxy group-containing vinyl monomers such as 4-hydroxybutyl vinyl ether or p-hydroxystyrene; monobasic or dibasic acid vinyl monomers of methacrylic acid, acrylic acid, crotonic acid, vinylbenzoic acid, fumaric acid, itaconic acid, maleic acid or citraconic acid; monoesters of dibasic acid and acid anhydride group-containing vinyl monomers, such as monomethyl maleate, monoethyl maleate, monobutyl maleate, monooctyl maleate, monomethyl itaconate, monoethyl itaconate, monobutyl itaconate, monooctyl itaconate, mono-2-ethylhexyl itaconate, monomethyl fumarate, monoethyl fumarate, monobutyl fumarate, monooctyl fumarate or monoethyl citraconate; and long-chain carboxyl group-containing vinyl monomers, including half-esterified reaction products of acid anhydrides and caprolactone-modified hydroxyl group-containing (meth) acrylic acid esters such as succinic acid monoesters obtained by esterification of the terminal hydroxyl group of a ε-caprolactone or γ-buytrolactone ring-opening addition product to β-carboxyethyl (meth)acrylate, β-carboxypropyl (meth)acrylate, β-(meth)acryloxyethyl acid succinate, β-(meth)acryloxyethyl acid maleate, β-(meth)acryloxyethyl acid phthalate, β-(meth)acryloxyethyl acid hexahydrophthalate, β-(meth)acryloxyethyl acid methylhexahydrophthalate, γ-(meth)acryloxypropyl acid succinate or 2-hydroxyethyl (meth)acrylate with succinic anhydride to introduce a terminal carboxyl group, and phthalic acid monoesters and hexahydrophthalic anhydride monoesters obtained by esterification of the terminal hydroxyl group of a ε-caprolactone or γ-buytrolactone ring-opening addition product (for example, Praxel F monomer by Dicell Chemicals, KK. or Tone M monomer by UCC Co.) to 2-hydroxyethyl (meth)acrylate with phthalic anhydride or hexahydrophthalic anhydride. These may be used either alone or in combinations of 2 or more as necessary, but the various characteristics including coating hardness, acid resistance, weather resistance and solvent resistance can be further improved by using (meth)acrylic acid ester monomers with alicyclic hydrocarbon substituents such as cyclohexyl (meth)acrylate, norbornyl (meth)acrylate, isobornyl (meth)acrylate and dicyclopentanyl (meth)acrylate, and adding them as monomer units in the acrylic copolymer (B) to an amount of 10–60 wt %. In this case, it is undesirable for the (meth)acrylic acid ester monomer unit with the alicyclic hydrocarbon substituent to be present at less than 10 wt % as this may result in an unsatisfactory effect of improvement in the various characteristics, or greater than 70 wt % as this may cause the coating to become brittle, tending to lower the weatherability and non-sand recoating property of the coating. The amount is more preferably in the range of 20–50 wt %.

By using hydroxyl group-containing vinyl monomers or carboxyl group-containing vinyl monomers as other polymerizable monomers in the composition of the invention to include hydroxyl groups or carboxyl groups in addition to epoxy groups in the acrylic copolymer (B), it is possible to increase the reactivity of the coating composition without impairing its storage stability, thus improving its low-temperature curing property as well as the solvent resistance and hardness of the resulting coating. The effect can be even further enhanced by using the hydroxyl group-containing vinyl monomers and carboxyl group-containing vinyl monomers to include epoxy groups, hydroxyl groups and carboxyl groups in the acrylic copolymer (B).

According to the invention, the epoxy equivalent value of the acrylic copolymer (B) is preferably 200–1,500 g/eq or greater, and the weight average molecular weight is preferably 1,000–20,000. This is because, if the epoxy equivalent value of the acrylic copolymer (B) exceeds 1,500 g/eq, the curing property may be inadequate, tending to lower the coating hardness and solvent resistance, while, if it is less than 200 g/eq, the covering composition may become thickened and prone to gelation; a more preferred range is 250–950 g/eq.

Also, if the weight average molecular weight of the acrylic copolymer (B) is less than 1,000, the moisture resistance and weatherability of the coating may tend to fall, and if it exceeds 20,000 the viscosity of the resin may be notably increased, tending to reduce the attractiveness and solvent resistance of the covering composition; a more preferable range is 3,000–15,000.

When hydroxyl groups or carboxyl groups are included in the acrylic copolymer (B), the hydroxyl group equivalent value is preferably in the range of 400–6,000 g/eq. If the hydroxyl group equivalent value of the acrylic copolymer (B) is less than 400 g/eq the moisture resistance may be lower, while if it is greater than 6,000 g/eq the non-sand recoating property may tend to be reduced; a more preferable range is 500–3000 g/eq.

The acid value of the acrylic copolymer (B) is preferably no greater than 50 mgKOH/g. If the acid value exceeds 50 mgKOH/g the covering composition may be thickened, and thus prone to gelation.

The weight ratio of the acrylic copolymer (A) and acrylic copolymer (B) in the thermosetting coating composition of the invention is preferably in the range of $1/3 \leq (A)/(B) \leq 10/3$. If the weight ratio of the acrylic copolymer (A) and acrylic copolymer (B) is less than 1/3 the storage stability and coating moisture resistance may tend to be lower, while if it exceeds 10/3 the coating solvent resistance and hardness may tend to be lower; a more preferred range is $1/2 \leq (A)/(B) \leq 4/2$.

The molar ratio of carboxyl groups and epoxy groups present in the acrylic copolymer (A) and acrylic copolymer (B) of the thermosetting covering composition of the invention is preferably in the range of $1/2 \leq$ carboxyl groups/epoxy groups $\leq 1/0.5$. It is preferably not outside of this range, as the unreacted functional groups may tend to lower the coating moisture resistance and weather resistance. A more preferable range is $1/1.8 \leq$ carboxyl groups/epoxy groups $\leq 1/0.7$.

Also, the coating moisture resistance and temperature variation cracking resistance can be still further increased by using a methacrylic acid ester monomer represented by general formula [I] below as the vinyl monomer constituent of the acrylic copolymer (A) in the thermosetting coating composition of the invention, added in an amount of 5–50 wt % in terms of monomer units, and by using a methacrylic acid ester monomer represented by the following general formula [I] as the vinyl monomer constituent of the acrylic copolymer (B) in the thermosetting coating composition of the invention, added in an amount of 0–25 wt % in terms of monomer units.

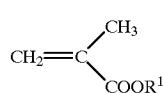

wherein $R^1$ represents a hydrocarbon group of 8–18 carbon atoms.

Here, it is not preferable for the amount of methacrylic acid ester monomer units of general formula [I] in the acrylic copolymer (A) to be less than 5 wt %, as the above-mentioned effect of improved performance may be insufficient, or for it to be greater than 50 wt %, as the coating hardness and solvent resistance may tend to fall. It is also not preferable for the amount of methacrylic acid ester monomer units of general formula [I] in the acrylic copolymer (B) to be greater than 25 wt %, as the coating hardness and solvent resistance may tend to be lower.

In addition, the coating acid resistance, solvent resistance and scratch resistance can be still further increased by using styrene as the vinyl monomer constituent of the acrylic copolymer (A) and acrylic copolymer (B) in the thermosetting coating composition of the invention, each in an amount of 5–25 wt % in terms of monomer units. It is not preferred for the amount of styrene to be less than 5 wt % as the effect of improved performance may be insufficient, or for it to be greater than 25 wt % as the coating weatherability may tend to be lower.

For further improvement in the yellowing resistance and non-sand recoating property, a hydroxyl group-containing polymer (E) may be added to the thermosetting coating composition of the invention in a range of 0.5–30 wt % with respect to the total amount of the acrylic copolymers (A) and (B). If the hydroxyl group-containing polymer (E) is added at less than 0.5 wt % with respect to the total amount of the acrylic copolymers (A) and (B), the improvement effect on the yellowing resistance and non-sand recoating property of the coating may be inadequate, while if it is added at greater than 30 wt % the coating hardness and solvent resistance may tend to be lower; a more preferable range is 5–20 wt %.

As useful hydroxyl group-containing polymers (E) there may be mentioned hydroxyl group-containing acrylic copolymers, hydroxyl group-containing polyester resins and hydroxyl group-containing epoxy resins. In the case of an acrylic copolymer, examples of hydroxyl group-containing vinyl monomers to be used include hydroxyalkyl group-containing (meth)acrylic acid esters such as 2-hydroxyethyl (meth)acrylate, 2-hydroxypropyl (meth)acrylate, 3-hydroxypropyl (meth)acrylate, 2-hydroxybutyl (meth) acrylate, 4-hydroxybutyl (meth)acrylate and 6-hydroxyhexyl (meth)acrylate; γ-butyrolactone ring-opening addition products to 2-hydroxyethyl methacrylate; ε-caprolactone ring-opening addition products to 2-hydroxyethyl acrylate; ethylene oxide ring-opening addition products to methacrylic acid; propylene oxide ring-opening addition products to methacrylic acid; (meth)acrylic acid esters with terminal hydroxyl groups, such as 2-hydroxyethyl (meth)acrylate or 2-hydroxypropyl (meth) acrylate dimers or trimers and other hydroxy group-containing vinyl monomers such as 4-hydroxybutyl vinyl ether or p-hydroxystyrene; these may be used alone or in combinations of 2 or more as necessary. The amount of these hydroxyl group-containing monomers to be used is preferably in a range of 250–1,000 g/eq in terms of hydroxy equivalents of the acrylic copolymer, and for example it may be in the range of 10–50 wt %, or more preferably in the range of 15–40 wt %. When a polyester resin or epoxy resin is used, the hydroxy equivalent value is also preferably in the range of 250–1,000 g/eq. This is,because if the hydroxy equivalent value of the hydroxyl group-containing polymer (E) is greater than 1,000 g/eq the coating non-sand recoating property and solvent resistance may tend to be lower, whereas if it is less than 250 g/eq the coating moisture resistance may tend to be lower.

As additional polymerizable vinyl monomers to be used for the acrylic copolymer in the hydroxyl group-containing polymer (E) there may be mentioned, for example, (meth) acrylic acid esters with hydrocarbon substituents such as methyl (meth)acrylate, ethyl (meth)acrylate, n-propyl (meth)acrylate, n-butyl (meth)acrylate, i-butyl (meth) acrylate, t-butyl (meth)acrylate, sec-butyl (meth)acrylate, n-pentyl (meth)acrylate, lauryl (meth)acrylate, tridecyl (meth)acrylate, 2-ethylhexyl (meth)acrylate and cyclohexyl (meth)acrylate; styrene derivatives such as styrene, vinyl-toluene and α-methylstyrene; ethylenic unsaturated nitrile compounds such as acrylonitrile and methacrylonitrile; N-alkoxy-substituted amides such as N-methoxymethyl acrylamide, N-ethoxymethyl acrylamide and N-butoxymethyl acrylamide; basic vinyl monomers such as dimethylaminoethyl (meth)acrylate and diethylaminoethyl (meth)acrylate; monobasic or dibasic acid vinyl monomers of methacrylic acid, acrylic acid, crotonic acid, vinylbenzoic acid, fumaric acid, itaconic acid, maleic acid or citraconic acid; vinyl monomers containing dicarboxylic acid monoester groups such as monomethyl maleate, monoethyl maleate, monobutyl maleate, monooctyl maleate and monomethyl itaconate; the long-chain carboxyl group-containing vinyl monomers listed for acrylic copolymer (A), and epoxy group-containing monomers such as glycidyl (meth)acrylate, methylglycidyl (meth)acrylate, 3,4-cyclohexyl-methyl(meth)acrylate and allylglycidyl ether. These may be used alone or in combinations of 2 or more as necessary.

The acrylic copolymers (A), (B) and (E) to be used in the composition of the invention may be produced by any known polymerization method including solution polymerization, bulk polymerization and emulsion polymerization, but solution polymerization is the most preferred method of production. When the aforementioned acrylic copolymers are produced by solution polymerization, a common organic solvent such as isopropanol, n-butanol, toluene or xylene may be selected for use. The polymerization initiator used may be selected from commonly used polymerization initiators such as azobisisobutyronitrile, benzoyl peroxide and cumene hydroperoxide. If necessary, a chain transfer agent such as 2-mercaptoethanol or n-octylmercaptane may also be used.

When the acrylic copolymers are produced by solution polymerization, it is generally preferred to conduct the polymerization in a temperature range of 80–160° C., and more preferably in a range of 100–140° C., for molecular weight control. For production of acrylic copolymers containing carboxyl groups and epoxy groups, simultaneous copolymerization of a carboxyl group-containing vinyl monomer and an epoxy group-containing vinyl monomer may notably increase the viscosity by reaction between the carboxyl groups and epoxy groups during polymerization and tend to produce gelation, and therefore the content of carboxyl groups and epoxy groups in the copolymer may be limited to a very low amount. Consequently, when epoxy groups are included in the acrylic copolymer (A) of the invention, a two-stage polymerization method is preferably used wherein the carboxyl group-containing vinyl monomers are copolymerized at a temperature of at least 100° C., and then the epoxy group-containing vinyl monomers are polymerized at a lower polymerization temperature of under 75° C. Similarly, when carboxyl groups are included in the acrylic copolymer (B) of the invention, a two-stage polymerization method is preferably used wherein the epoxy group-containing vinyl monomers (including, if necessary, hydroxyl group-containing monomers) are copolymerized at a temperature of at least 100° C., and then the carboxyl group-containing vinyl monomers are polymerized at a lower polymerization temperature of under 75° C.

Auxiliary curing agents such as melamine resins or block isocyanate resins may also be added if necessary to the thermosetting coating composition of the invention. These may be added in suitable amounts which do not impair the storage stability or coating performance of the coating composition. A preferred amount for their addition is no greater than 20 wt % with respect to the total amount of the acrylic copolymers (A) and (B). This is because, when auxiliary curing agents are added at greater than 20 wt %, the coating acid resistance tends to be lower and the coating may become prone to yellowing. In addition to the auxiliary curing agents referred to above, there may also be mentioned epoxy compounds such as glycidyl ethers, glycidyl esters and alicyclic epoxy compounds, and terminal carboxyl group-containing polyester resins with acid values of 100–200 mg/KOH. These auxiliary curing agents may also be used in mixtures of 2 or more.

A catalyst for curing acceleration may also be added to the thermosetting coating composition of the invention. The curing catalyst may be any known catalyst used for an esterification reaction of acid groups and ester groups, and preferred examples are quaternary ammonium salts and phosphonium salts. Specifically there may be mentioned benzyltrimethylammonium chloride, benzyltrimethylammonium bromide, tetrabutylammonium chloride, tetrabutylammonium bromide, tetrabutylammonium hydroxide, benzyltriphenylphosphonium chloride and benzyltriphenylphosphonium bromide.

For improved stability, an acidic compound such as a sulfonic acid-based or phosphoric acid-based compound may be added if necessary. Specifically there may be mentioned para-toluenesulfonic acid, dodecylbenzenesulfonic acid, dinonylnaphthalenesulfonic acid and their amine blocked compounds, and monoalkylphosphoric acids, dialkylphosphoric acids and monoalkylphosphorous acids.

In addition, other additives, including rheology modifiers such as organic bentone, polyamides, microgels and fibrinogen-based resins, surface modifiers represented by silicone, ultraviolet absorbers, light stabilizers, antioxidants, anti-drip agents, may also be added if necessary to the thermosetting coating composition of the invention, by publicly known means and in suitable amounts.

When the thermosetting coating composition of the invention is to be used as a clear coating for automobile finishing, the base coat layer adjacent to the clear coat layer may also be a thermosetting coating composition according to the invention, but known curing resins may also be used in appropriate amounts as necessary. The base coating can be modified by addition of such thermosetting resins with diluting agents comprising volatile organic solvents, curing agents comprising amino resins or polyisocyanate compounds, brightening agents such as aluminum paste, mica and flake-like iron oxide, inorganic and organic pigments such as titanium oxide, carbon black and quinacridone, resin additives such as polyester resins, epoxy resins and cellulose resins, as well as surface modifiers, ultraviolet absorbers and antioxidants, in appropriate amounts as necessary using known means.

When the thermosetting coating composition used as a base coat has N-alkoxyalkyl-substituted amide groups as reactive functional groups, vastly improved attractiveness may be achieved with a multilayer coating whereby the thermosetting coating composition of the invention is formed by the 2-coat 1-bake coating method.

Specifically, N-methoxymethyl acrylamide, N-methoxymethyl methacrylamide, N-ethoxymethyl acrylamide, N-propoxymethyl acrylamide or N-butoxymethyl acrylamide, for example, may be used as the N-alkoxyalkyl-substituted amide group-containing vinyl monomer for appropriate polymerization with another vinyl monomer which is copolymerizable with the amide-based monomer, to obtain an acrylic copolymer as the major component of the thermosetting covering composition.

The amount of the amide-based monomer to be used may be in a range of 5–50 wt %. If the amide-based monomer is used at less than 5 wt % the crosslinked density of the coating may be lower, resulting in a lower level of solvent resistance and non-sand recoating property, while if it is used at over 50 wt % the coating moisture resistance may tend to be lower. The amount is preferably in the range of 15–40 wt %.

The specific monomers mentioned above to be used for acrylic copolymer (A) may generally be used as the other copolymerizable vinyl monomer as well.

Also, if the thermosetting coating composition used as a base coat includes an acrylic copolymer (C) containing at least 2 carboxyl groups per molecule and an acrylic copolymer (D) containing at least 2 epoxy groups per molecule in a total amount of 10–50 wt % of the 2 components with respect to the resin solid portion of the thermosetting coating composition, vastly improved attractiveness may be achieved for multilayer coatings in which a thermosetting coating composition of the invention is used as a clear coat.

If the total of the acrylic copolymer (C) and acrylic copolymer (D) constituents of the thermosetting coating composition used as the base coat is less than 10 wt %, the effect of improved attractiveness may be inadequate, while if it exceeds 50 wt % the storage stability of the thermosetting covering composition may be undesirably lowered.

The acrylic copolymer (C) may be obtained by appropriate polymerization of the aforementioned dicarboxylic acid monoester group-containing vinyl monomers given as specific examples of monomers to be used for acrylic copolymer (A) or other carboxyl group-containing vinyl monomers, with other vinyl monomers which are copolymerizable therewith, and its acid value is preferred to be in the range of 30–150 mgKOH/g. The acrylic copolymer (D) may be obtained by appropriate polymerization of the aforementioned epoxy group-containing vinyl monomers mentioned for acrylic copolymer (B) with other vinyl monomers which are copolymerizable therewith, and it preferably has an epoxy equivalent value in the range of 400–1,500 g/eq. The mixing ratio for the acrylic copolymers (C) and (D) is preferably adjusted so that the equivalent ratio of carboxyl groups and epoxy groups is $1/2 \leq$ carboxyl groups/epoxy groups $\leq 2$. If necessary, the aforementioned quaternary ammonium salts or phosphonium salts may be used as curing catalysts, and a melamine resin may also be used in an amount of no more than 20 wt % with respect to the total amount of the acrylic copolymers (C) and (D). Also, volatile organic solvents, pigments and brightening agents commonly used for base coats may also be appropriately combined therewith as necessary.

The present invention will now be explained in detail by way of examples. The terms "parts" and "%" throughout the examples are all based on weight.

The properties of the copolymers were evaluated as follows.

Viscosity:
Value as measured with a Gardner-Holt viscometer (25° C.)

Nonvolatile content:
Proportion of nonvolatile matter obtained upon sampling 1 g of resin onto an aluminum dish and drying at 150° C. for one hour.

Hydroxy equivalents:
Number of grams of resin containing 1 gram equivalent of hydroxyl groups Acid value:
Number of milligrams of potassium hydroxide required to neutralize 1 g of the acrylic copolymer Epoxy equivalents:
Number of grams of resin containing 1 gram equivalent of epoxy groups Weight average molecular weight:
Measured by gel permeation chromatography The characteristics of the coatings were evaluated as follows.

Coating viscosity:
Number of seconds until all the coating in a No. 4 Ford cup dripped off (20° C.)

The coating performance was evaluated in the following manner.

Visual appearance:
Judged primarily based on polished feel and smoothness.

Gloss:
Measured using a digital deformation gloss meter (60° G) manufactured by Suga Testing Equipment, KK.

Hardness:
Hardness measured by scratching the coating at a 45° angle using a Mitsubishi Pencil "Uni"

Acid resistance:
Visual determination of spots upon dropwise addition of 40° C. aqueous sulfuric acid solution, allowing to stand at 70° C. for 15 minutes, and washing with water Moisture resistance:
Visual judgment of appearance after immersion for 168 hours in 50° C. hot water Solvent resistance:
Visual judgment of appearance after 50-pass rubbing test using gauze immersed in methyl ethyl ketone Weatherability:
Visual judgment of appearance of coating after 1,500 hour exposure test with Sunshine Weather-O-Meter manufactured by Suga Testing Equipment, KK Scratch resistance:
Visual determination of damage upon applying gauze to contact locations of the coated surface and performing a 10-pass abrasion test with a 1 kg load using a color fastness tester manufactured by Daiei Scientific Instruments, KK.

Storage stability:
Indicates the condition of the coating after standing at 30° C. for 72 hours.
⊚ normal
○ slight viscosity increase but no problem with use
Δ thickening, problems with use
× gelation, unusable Low-temperature curing property:
Visual judgment of appearance of coating after performing the solvent resistance test described above, using xylene on a coated panel baked at 120° C.

Non-sand recoating property:
A zinc phosphate-treated steel plate (30 cm×90 cm) was painted with an automotive cationic electrocoating and baked at 180° C. for 30 minutes. After further coating with an aminoalkyd resin-based second coating and baking at 160° C. for 30 minutes, the coating was sanded and dried to obtain a test piece.

The test piece was first double-coated with a base coating and a clear coating by a wet-on-wet system, and after baking for 25 minutes with a hot-air drier at 160° C. and cooling, while still unsanded it was again double-coated with the same base coating and clear coating by the wet-on-wet system and baked for 25 minutes with a hot-air drier at 120° C., to form a multilayer coating for evaluation.

Scratches 1 cm square were made in the laminated coating at 1 mm spacings to make 100 square boxes, and after pasting cellophane tape thereover and peeling it off at one stroke, the adhesive property was evaluated based on the number of squares which remained without peeling.
⊚ no peeling (100/100)
○ area remaining without peeling at least 95/100
Δ area remaining without peeling at least 50/100 and less than 95/100
× area remaining without peeling less than 50/100

Temperature variation cracking resistance:
A zinc phosphate-treated steel plate (30 cm×90 cm) was coated with an automotive cationic electrocoating and baked at 180° C. for 30 minutes. After further coating with an aminoalkyd resin-based second coating and baking at 160° C. for 30 minutes, the coating was sanded and dried to obtain a test piece.

The test piece was first double-coated with a base coating and a clear coating by a wet-on-wet system, and then baked for 25 minutes with a hot-air drier at 120° C., to form a multilayer coating for evaluation. Upon allowing the coated plate to stand for 30 minutes in a hot-air drier at 40° C., it was placed in a methanol bath filled with dry ice at −40° C. for rapid cooling. After standing for 30 minutes in the methanol bath, the coating was checked for cracks. The same procedure was repeated for 5 cycles.

The numbers represent the number of cycles completed before cracks were produced in the coated plate (⊚ signifying no cracking during the 5 cycles).

Scale for visual judgment
⊚ no change in quality of coating before and after performance test; judged as maintaining very excellent coating performance.
○-⊚ virtually no change in quality of coating before and after performance test; judged as maintaining excellent coating performed.
○ quality of coating after performance test slightly lower than before test, but judged as exhibiting adequate practical performance.
Δ-○ quality of coating after performance test lower than before test, but judged as exhibiting adequate practical performance.
×-Δ quality of coating after performance test lower than before test; judged as having problems for practical use.

x quality of coating after performance test notably lower than before test; judged as being unsuitable for practical use.

(1) Base coating (M-1) production example

After adding 10 parts of n-butanol and 90 parts of toluene as solvents into a vessel equipped with an agitator, a temperature control device and a condenser, and heating to 100° C. while stirring, a vinyl monomer/polymerization initiator mixture comprising 40 parts of methyl methacrylate, 30 parts of ethyl acrylate, 15 parts of n-butyl acrylate, 12 parts of 2-hydroxyethyl methacrylate, 3 parts of methacrylic acid and 0.6 part of azobisisobutyronitrile was added dropwise into the solvent over a period of 4 hours and then polymerized at the same temperature for 3 hours to synthesize an acrylic copolymer (B-1). The nonvolatile content of the resulting acrylic copolymer (B-1) was 50%, and its weight average molecular weight was 40,000. Next, 100 parts of the acrylic copolymer (B-1), 25 parts of UVAN 20SE-60 (butylated melamine resin, solid portion: 60%, product of Mitsui Toatsu Chemicals, Inc.) and 14 parts of Alpaste #1700NL (aluminum paste with solid portion: 65%, product of Toyo Aluminum, KK.) were mixed to obtain a base coating composition. The base coating composition was diluted with a mixed solvent comprising ethyl acetate/toluene/Solvesso #150 (aromatic hydrocarbon, product of Esso Co.) at 40/30/30 (wt %), and the viscosity of the base coating composition was adjusted to 13 seconds with a Ford cup #4, to obtain a silver metallic base coating (M-1).

The amide-crosslinked acrylic copolymer (B-2) having N-alkoxy-substituted amide groups as reactive functional groups, (B-3) and (B-4) as specific examples of the acrylic copolymer (C) and (B-5) as a specific example of the acrylic copolymer (D) were polymerized with the monomer compositions listed in Table 6, to obtain resin solutions having the characteristic values also listed in Table 6. The coating compositions listed in Table 7 were also used to prepare base coatings (M-2) to (M-6) by the same method described for (M-1) above.

(2) Synthesis of acrylic copolymer (P-1)

After adding 20 parts of butyl acetate and 50 parts of Solvesso #100 (aromatic petroleum derivative, product of Esso Co.) as solvents into a reaction vessel equipped with an agitator, a temperature control device and a condenser, and heating to 100° C. while stirring, a monomer/polymerization initiator mixture comprising 10 parts of methyl methacrylate, 49.1 parts of t-butyl methacrylate, 15 parts of 2-ethylhexyl acrylate, 20 parts of maleic anhydride, 30 parts of butyl acetate and 3 parts of azobisisobutyronitrile was continuously added dropwise into the vessel over a period of 4 hours and then polymerized for 3 hours while keeping the temperature in the flask at 100° C., for a sufficiently high conversion rate to the resin. The temperature in the vessel was then lowered to 70° C., 5.9 parts of methanol and 0.6 part of triethylamine were further added, and the internal temperature was kept at 70° C. for 7 hours for partial monoesterification of the acid anhydride groups. The reduction in acid anhydride groups was confirmed by IR, and thus an acrylic copolymer (P-1) with a resin solid portion of 50% was obtained. The characteristic values of the resulting copolymer (P-1) are shown in Table 1, and this copolymer (P-1) consisted of 23.9 parts monomethyl maleate monomer units and 2 parts maleic anhydride monomer units against 100 parts as the total monomer units.

(3) Synthesis of acrylic copolymers (P-4), (P-6), (P-8), (P-10), (P-13), (P-14), (P-15), (P-19), (P-20)

The vinyl monomers listed in Table 1 were each polymerized according to the synthesis method for acrylic copolymer (P-1), to synthesize acrylic copolymers (P-4), (P-6), (P-8), (P-10), (P-13), (P-14), (P-15), (P-19) and (P-20). The characteristic values of the resulting copolymers are listed in Table 1.

(4) Synthesis of acrylic copolymer (P-2)

After adding 45 parts of butyl acetate and 50 parts of Solvesso #100 (aromatic petroleum derivative, product of Esso Co.) as solvents into a reaction vessel equipped with an agitator, a temperature control device and a condenser, and heating to 100° C. while stirring, a monomer/polymerization initiator mixture comprising 15 parts of methyl methacrylate, 44.8 parts of t-butyl methacrylate, 20 parts of 2-ethylhexyl acrylate, 10 parts of monobutyl maleate, 1.2 parts of maleic anhydride, 5 parts of butyl acetate, 9 parts of methacrylic acid and 3 parts of azobisisobutyronitrile was continuously added dropwise into the vessel over a period of 4 hours.

Polymerization was then conducted for 3 hours while keeping the temperature in the vessel at 100° C., and the reaction was terminated when a sufficiently high conversion rate to the resin was achieved, to obtain acrylic copolymer (P-2). The characteristic values of the resulting acrylic copolymer are listed in Table 1.

(5) Synthesis of acrylic copolymers (P-5), (P-7), (P-9), (P-11), (P-12), (P-16), (P-17), (P-18)

The vinyl monomers listed in Table 1 were each polymerized according to the synthesis method for acrylic copolymer (P-2), to synthesize acrylic copolymers (P-5), (P-7), (P-9), (P-11), (P-12), (P-16), (P-17) and (P-18). The characteristic values of the resulting copolymers are listed in Table 1.

(6) Synthesis of acrylic copolymer (P-3)

After adding 45 parts of butyl acetate and 50 parts of Solvesso #100 as solvents into a reaction vessel equipped with an agitator, a temperature control device and a condenser, and heating to 100° C. while stirring, a monomer/polymerization initiator mixture comprising 4.5 parts of methyl methacrylate, 40.2 parts of t-butyl methacrylate, 29.2 parts of 2-ethylhexyl acrylate, 12 parts of monobutyl maleate, 5 parts of methacrylic acid, 0.8 part of maleic anhydride, 5 parts of butyl acetate and 3 parts of azobisisobutyronitrile was added dropwise into the vessel over a period of 4 hours.

The temperature in the vessel was then lowered to 75° C., a monomer/polymerization initiator mixture comprising 2 parts of glycidyl methacrylate, 0.5 parts of methyl methacrylate, 5 parts of t-butyl methacrylate, 0.8 part of 2-ethylhexyl acrylate and 1 part of azobismethylvaleronitrile was added dropwise into the vessel over a period of 2 hours. After the dropwise addition was completed, polymerization was conducted for 3 hours while keeping the temperature in the vessel at 75° C., and the reaction was terminated when a sufficiently high conversion rate to the resin was achieved, to synthesize acrylic copolymer (P-3). The characteristic values of the resulting acrylic copolymer are listed in Table 1.

(7) Synthesis of acrylic copolymer (G-1)

After adding 20 parts of n-butanol and 80 parts of Solvesso #100 as solvents into a reaction vessel equipped with an agitator, a temperature control device and a condenser, and heating to 120° C. while stirring, a monomer/polymerization initiator mixture comprising 20 parts of methyl methacrylate, 10 parts of n-butyl methacrylate, 20 parts of 2-ethylhexyl acrylate, 20 parts of 2-hydroxyethyl methacrylate, 30 parts of glycidyl methacrylate, 3 parts of azobisisobutyronitrile and 7 parts of t-butylperoxy isopropylcarbonate was added dropwise into the vessel over a period of 4 hours, polymerization was conducted for 3 hours while keeping the temperature in the vessel at 120° C., and the reaction was terminated when a sufficiently high conversion rate to the resin was achieved, to synthesize acrylic copolymer (G-1). The characteristic values of the resulting acrylic copolymer are listed in Table 2.

(8) Synthesis of acrylic copolymers (G-2), (G-4)–(G-9), (G-10)–(G-14)

The vinyl monomers listed in Table 2 were each polymerized according to the synthesis method for acrylic copolymer (G-1), to synthesize acrylic copolymers (G-2), (G-4)–(G-9) and (G-10)–(G-14). The characteristic values of the resulting copolymers are listed in Table 2.

(9) Synthesis of acrylic copolymer (G-3)

After adding 20 parts of n-butanol and 80 parts of Solvesso #100 as solvents into a reaction vessel equipped with an agitator, a temperature control device and a condenser, and heating to 120° C. while stirring, a monomer/polymerization initiator mixture comprising 9 parts of methyl methacrylate, 29.5 parts of n-butyl acrylate, 9 parts of 2-ethylhexyl acrylate, 13.5 parts of 4-hydroxybutyl acrylate, 30 parts of glycidyl methacrylate, 3 parts of azobisisobutyronitrile and 7 parts of t-butylperoxyisopropyl carbonate was added dropwise into the vessel over a period of 4 hours.

The temperature in the vessel was then lowered to 75° C., a monomer/polymerization initiator mixture comprising 1 part of methyl methacrylate, 3.5 parts of n-butyl methacrylate, 1 part of 2-ethylhexyl acrylate, 1.5 parts of 4-hydroxybutyl acrylate, 2 parts of methacrylic acid and 1 part of azobismethylvaleronitrile was added dropwise into the vessel over a period of 2 hours. After the dropwise addition was completed, polymerization was conducted for 3 hours while keeping the temperature in the vessel at 75° C., and the reaction was terminated when a sufficiently high conversion rate to the resin was achieved, to synthesize acrylic copolymer (G-3). The characteristic values of the resulting acrylic copolymer are listed in Table 2.

(10) Synthesis of acrylic copolymers (H-1), (H-3)

The vinyl monomers listed in Table 3 were each polymerized according to the synthesis method for acrylic copolymer (G-1), to synthesize hydroxyl group-containing acrylic copolymers. The characteristic values of the resulting copolymers are listed in Table 3.

(11) Synthesis of hydroxyl group-containing polyester resin (H-2)

After charging 44 parts of Cardura E10 (product of Yuka Shell Epoxy, KK.), 41 parts of isophthalic acid, 6 parts of trimethylolpropane and 9 parts of 1,6-hexanediol into a reaction vessel equipped with an agitator, a thermometer and a condenser, reaction was conducted in a nitrogen gas flow at 220° C. for 10 hours to obtain a polyester resin with an acid value of 9, a hydroxy equivalent value of 800 and a weight average molecular weight of 3500. Xylene was then added for dilution to a nonvolatile content of 60%, giving characteristic values of a Gardner viscosity of 0, an acid value of 5.4 and a hydroxy equivalent value of 1333.

(12) Preparation of clear paints

The acrylic copolymers listed in Tables 1, 2 and 3 (H-2 being a polyester resin) were mixed in the proportions indicated in Tables 4 and 9, and after thorough stirring a mixed solvent was added to each (Solvesso #100/cellosolve acetate=80/20 (weight ratio)) for dilution to a coating viscosity of 28 seconds (using a Ford cup No. 4, measuring temperature: 20° C.) to prepare clear coatings.

TABLE 1

| Acrylic copolymer (A) | | P-1 | P-2 | P-3 | P-4 | P-5 | P-6 | P-7 | P-8 | P-9 | P-10 |
|---|---|---|---|---|---|---|---|---|---|---|---|
| Monomer component | styrene | | | | | | | | | | 10 |
| | methyl methacrylate | 10 | 15 | 5 | | | | | | | |
| | t-butyl methacrylate | 49.1 | 44.8 | 45.2 | | | | | | | |
| | isobornyl methacrylate | | | | 40 | | | | | | |
| | isobornyl acrylate | | | | | 48 | | | | | |
| | cyclohexyl methacrylate | | | | | | 60 | | 55 | 50 | 53.8 |
| | cyclohexyl acrylate | | | | | | | 50 | | | |
| | 2-ethylhexyl acrylate | 15 | 20 | 30 | 40.8 | 32 | 20.6 | 24 | 15.7 | 22.3 | 10 |
| | 2-ethylhexyl methacrylate | | | | | | | | 15.7 | 22.3 | 10 |
| | monomethyl maleate*1 | (23.9) | | | (17.1) | | (17.9) | 25 | (27.7) | | (25.2) |
| | monobutyl maleate | | 10 | 12 | | 12 | | | | | |
| | monooctyl itaconate | | | | | | | | | 17.2 | |
| | methacrylic acid | | 9 | 5 | | 5 | | | | 8 | |
| | glycidyl methacrylate | | 2 | | | | | | | | |
| | maleic anhydride | 2 | 1.2 | 0.8 | 2.1 | 3 | 1.5 | 1 | 1.6 | 2.5 | 1 |
| Solvent | butyl acetate | 50 | 50 | 50 | 50 | 50 | 50 | 50 | 50 | 50 | 50 |
| | Solvesso #100 | 50 | 50 | 50 | 50 | 50 | 50 | 50 | 50 | 50 | 50 |
| Solution | nonvolatile content (wt %) | 50 | 50 | 50 | 50 | 50 | 50 | 50 | 50 | 50 | 50 |
| | Gardner viscosity (25° C.) | Y | V | X | V | T | X | U | Y | Y | Y |
| copolymer | acid value (mgKOH/g) | 103 | 91 | 72 | 74 | 72 | 77 | 108 | 119 | 92 | 108 |
| | epoxy equivalents (g/eq) | | | 7100 | | | | | | | |
| | weight average molecular weight | 10000 | 8000 | 12000 | 16000 | 7000 | 15000 | 10000 | 12000 | 8000 | 11000 |

| Acrylic copolymer (A) | | P-11 | P-12 | P-13 | P-14 | P-15 | P-16 | P-17 | P-18 | P-19 | P-20 |
|---|---|---|---|---|---|---|---|---|---|---|---|
| Monomer component (parts by weight) | styrene | 15 | | | | | | | 20 | 20 | 15 | 15 |
| | methyl methacrylate | | 10 | 10 | 20 | 10 | 20 | | | | | |
| | t-butyl methacrylate | | 49 | 46.7 | 10 | 40 | 40 | | 46 | 20 | 35 | 35 |
| | isobornyl methacrylate | | | | | | | | | | | |
| | isobornyl acrylate | 32.2 | | | | | | | | | | |
| | cyclohexyl methacrylate | | | | | | | | | | | |
| | cyclohexyl acrylate | 32.2 | | | | | | | | | | |

TABLE 1-continued

|  |  |  |  |  |  |  |  |  |  |  |  |
|---|---|---|---|---|---|---|---|---|---|---|---|
|  | 2-ethylhexyl acrylate |  | 25 | 20 | 17.6 | 26.1 | 26 | 25 | 21 | 24.1 | 24.1 |
|  | 2-ethylhexyl methacrylate | 30 |  |  |  |  |  |  |  |  |  |
|  | monomethyl maleate*[1] |  |  | (13.3) | (50.4) | (15.9) |  | 5 |  | (23.9) | (23.9) |
|  | monobutyl maleate | 15 |  |  |  |  | 1 |  | 25 |  |  |
|  | monooctyl itaconate |  |  |  |  |  |  |  |  |  |  |
|  | methacrylic acid | 7 | 15 | 10 |  |  | 10 | 2 | 12 |  |  |
|  | glycidyl methacrylate |  |  |  |  |  |  |  |  |  |  |
|  | maleic anhydride | 0.8 | 1 |  | 2 | 8 | 3 | 2 | 2 | 2 | 2 |
| Solvent | butyl acetate | 50 | 50 | 50 | 50 | 50 | 50 | 50 | 50 | 50 | 50 |
|  | Solvesso #100 | 50 | 50 | 50 | 50 | 50 | 50 | 50 | 50 | 50 | 50 |
| Solution | nonvolatile content (wt %) | 50 | 50 | 50 | 50 | 50 | 50 | 50 | 50 | 50 | 50 |
|  | Gardner viscosity (25° C.) | X | $Z_1$ | X | Z | V | Y | Z' | $Z_1$ | A | $Z_6$ |
| copolymer | acid value (mgKOH/g) | 94 | 98 | 122 | 217 | 68 | 68 | 35 | 159 | 103 | 103 |
|  | epoxy equivalents (g/eq) |  |  |  |  |  |  |  |  |  |  |
|  | weight average molecular weight | 10000 | 13000 | 7000 | 6000 | 10000 | 11000 | 16000 | 7000 | 1800 | 50000 |

Notes
*[1]Values in parentheses, as indicated in the production examples, are monomer units from reaction of methanol with a polymer prepared by copolymerization of maleic anhydride, and thus consist of a copolymerized component.
[2]Acid value and epoxy equivalents converted to resin solid values.

TABLE 2

| Acrylic copolymer (B) |  | G-1 | G-2 | G-3 | G-4 | G-5 | G-6 | G-7 | G-B | G-9 | G-10 | G-11 | G-12 | G-13 | G-14 |
|---|---|---|---|---|---|---|---|---|---|---|---|---|---|---|---|
| Monomer component (parts by weight) | styrene |  |  |  |  |  |  |  |  | 15 |  | 5 |  |  | 20 |
|  | methyl methacrylate | 20 | 10 | 10 |  |  |  |  |  |  | 10 |  | 10 |  |  |
|  | t-butyl methacrylate |  |  |  |  |  |  |  |  |  | 40 |  | 20 |  |  |
|  | n-butyl methacrylate | 10 | 20 | 33 | 10 |  |  |  |  |  |  |  |  | 20 |  |
|  | norbornyl methacrylate |  |  |  |  | 30 |  |  |  |  |  |  |  |  |  |
|  | dicyclopentanyl methacrylate |  |  |  | 20 |  |  |  |  |  |  |  |  |  |  |
|  | cyclohexyl methacrylate |  |  |  |  |  |  | 20 | 30 | 25 |  |  |  |  |  |
|  | cyclohexyl acrylate |  |  |  |  |  | 40 |  |  |  |  |  |  |  |  |
|  | 2-ethylhexyl acrylate | 20 | 10 | 10 | 15 | 20 | 10 | 20 |  |  | 20 |  | 20 |  |  |
|  | 2-ethylhexyl methacrylate |  |  |  |  |  |  |  |  | 15 |  | 15 |  | 10 | 28 |
|  | n-butyl acrylate |  |  |  |  |  |  |  |  |  |  |  |  |  |  |
|  | lauryl methacrylate |  |  |  |  |  |  |  |  | 15 |  |  |  |  |  |
|  | 2-hydroxyethyl acrylate |  |  |  |  | 15 | 20 |  |  | 25 |  |  | 5 |  |  |
|  | 2-hydroxyethyl methacrylate | 20 |  |  | 30 |  |  | 20 |  |  | 20 |  | 20 |  |  |
|  | 4-hydroxybutyl acrylate |  | 20 | 15 |  |  |  |  |  |  | 15 |  |  | 40 | 2 |
|  | 3,4-epoxycyclohexyl methyl methacrylate |  |  |  |  |  |  |  |  |  |  | 10 |  |  |  |
|  | glycidyl methacrylate | 30 | 40 | 30 | 25 | 35 | 30 | 40 | 30 | 30 |  | 75 | 30 | 30 | 50 |
|  | methacrylic acid |  |  | 2 |  |  |  |  |  |  |  |  |  |  |  |
| Solvent | n-butanol | 20 | 20 | 20 | 20 | 20 | 20 | 20 | 20 | 20 | 20 | 20 | 20 | 20 | 20 |
|  | Solvesso #100 | 80 | 80 | 80 | 80 | 80 | 80 | 80 | 80 | 80 | 80 | 80 | 80 | 80 | 80 |
| Solution | nonvolatile content (wt %) | 50 | 50 | 50 | 50 | 50 | 50 | 50 | 50 | 50 | 50 | 50 | 50 | 50 | 50 |
|  | Gardner visc. (25° C.) | F | P | O | J | H | K | M | P | L | N | G | $Z_2$ | N | O |
| Copolymer | epoxy eq (g/eq) | 473 | 355 | 473 | 568 | 406 | 473 | 355 | 473 | 473 | 1960 | 189 | 473 | 473 | 284 |
|  | hydroxy eq (q/eq) | 650 | 720 | 960 | 433 | 773 | 580 | 650 | 464 | 960 | 650 | 2320 | 650 | 360 | 7200 |
|  | acid value (mgKOH/g) |  |  | 13 |  |  |  |  |  |  |  |  |  |  |  |
|  | wt av. molecular wt | 5000 | 12000 | 8000 | 6000 | 7000 | 9000 | 11000 | 13000 | 7000 | 6000 | 3000 | 30000 | 7000 | 12000 |

Note
*[1]Epoxy equivalents, hydroxy equivalents and acid values converted to resin solid values.

TABLE 3

| Hydroxy group-containing polymer (E) |  | H-1 | H-2 | H-3 |
|---|---|---|---|---|
| Monomer component (parts by weight) | styrene | 10 |  | 5 |
|  | t-butyl methacrylate | 51 |  | 14 |
|  | 2-ethylhexyl acrylate | 8 |  | 20 |
|  | 2-hydroxyethyl |  | 30 |  |

TABLE 3-continued

| Hydroxy group-containing polymer (E) | | H-1 | H-2 | H-3 |
|---|---|---|---|---|
| | acrylate 2-hydroxyethyl methacrylate | | 60 | |
| | methacrylic acid | 1 | | 1 |
| | Cardura E10 | | 44 | |
| | isophthalic acid | | 41 | |
| | trimethylolpropane | | 6 | |
| | 1,6-hexanediol | | 9 | |
| Solvent | n-butanol | 20 | — | 20 |
| | Solvesso #100 | 80 | — | 80 |
| | xylene | | 66.7 | |
| Solution | nonvolatile content (wt %) | 50 | 60 | 50 |
| | Gardner viscosity (25° C.) | N | O | R |
| Copolymer | hydroxy equivalents (g/eq) | 387 | 800 | 217 |
| | acid value (mgKOH/g) | 6.5 | 9 | 6.5 |
| | wt. average molecular wt. | 7000 | 3500 | 5000 |

Note
*1Hydroxy equivalents and acid values converted to resin solid values

Note

*1: Hydroxy equivalents and acid values converted to resin solid values

TABLE 5

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Storage stability | ○ | ○ | ○ | ○ | ⊚ | ○ | ⊚ | ○ | ⊚ | ○ | ○ |
| Visual appearance | ○ | ○ | ○ | ○ | ○ | ○ | ○ | ○ | ○–⊚ | ○–⊚ | ○–⊚ |
| Luster | 95 | 96 | 94 | 94 | 96 | 96 | 95 | 96 | 98 | 98 | 97 |
| Hardness | F | F | H | H | H | H | H | H | H | H | H |
| Acid resistance | ○ | ○ | ○ | ○ | ○–⊚ | ○–⊚ | ○–⊚ | ○–⊚ | ○–⊚ | ○–⊚ | ○–⊚ |
| Moisture resistance | ○ | ○ | ○ | ○ | ○–⊚ | ○–⊚ | ○–⊚ | ○–⊚ | ○–⊚ | ○–⊚ | ○–⊚ |
| Solvent resistance | ○ | ○ | ○ | ○ | ○–⊚ | ○–⊚ | ○–⊚ | ○–⊚ | ○–⊚ | ○–⊚ | ○–⊚ |
| Weatherability | ○ | ○ | ○ | ○ | ○–⊚ | ○–⊚ | ○–⊚ | ○–⊚ | ○–⊚ | ○–⊚ | ⊚ |
| Non-sand recoating property | ○ | ○ | ○ | ○ | ○ | ○ | ○ | ○ | ○ | ○ | ○ |
| Temperature variation crack resistance | ⊚ | ⊚ | ⊚ | ⊚ | ⊚ | ⊚ | ⊚ | ⊚ | ⊚ | ⊚ | ⊚ |
| Scratch resistance | ○ | ○ | ○ | ○ | ○ | ○ | ○ | ○ | ○–⊚ | ○–⊚ | ○–⊚ |
| Low-temperature curing property | ○ | ○ | ○ | ○ | ○–⊚ | ○–⊚ | ○–⊚ | ○–⊚ | ○–⊚ | ○–⊚ | ○–⊚ |

Example    Co. Ex.

TABLE 4

| | | Example | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Acrylic copolymer (A) | | P-1 | P-2 | P-3 | P-1 | P-4 | P-5 | P-1 | P-2 | P-4 | P-5 | P-6 | P-7 | P-8 |
| | | 100 | 100 | 100 | 100 | 100 | 100 | 100 | 100 | 100 | 100 | 100 | 100 | 100 |
| Acrlyic copolymer (B) | | G-1 | G-2 | G-1 | G-3 | G-1 | G-2 | G-4 | G-5 | G-4 | G-5 | G-6 | G-7 | G-8 |
| | | 90 | 60 | 60 | 90 | 60 | 50 | 100 | 70 | 80 | 50 | 70 | 70 | 100 |
| Hydroxy group-containing polymer (E) | | | | | | | | | | | | | | |
| Modaflow*1 | | 0.2 | 0.2 | 0.2 | 0.2 | 0.2 | 0.2 | 0.2 | 0.2 | 0.2 | 0.2 | 0.2 | 0.2 | 0.2 |
| BTBAC*2 | | 1.0 | 0.8 | 0.8 | 1.0 | 0.8 | 0.8 | 1.0 | 0.9 | 0.9 | 0.8 | 0.9 | 0.9 | 1.0 |
| Chinubin 900*3 | | 2.0 | 1.6 | 1.6 | 2.0 | 1.6 | 1.6 | 2.0 | 1.8 | 1.8 | 1.6 | 1.8 | 1.8 | 2.0 |
| Sanol 440*4 | | 2.0 | 1.6 | 1.6 | 2.0 | 1.6 | 1.6 | 2.0 | 1.8 | 1.8 | 1.6 | 1.8 | 1.8 | 2.0 |
| Auxiliary curing agent | UVAN 20SE*5 | | | | | | | | | | | | | |
| | Denacol EX-212*6 | | | | | | | | | | | | | |

| | | Example | | | | | | | Co. Ex. | |
|---|---|---|---|---|---|---|---|---|---|---|
| | | 14 | 15 | 16 | 17 | 18 | 19 | 20 | 15 | 16 |
| Acrylic copolymer (A) | | P-9 | P-10 | P-11 | P-1 | P-2 | P-1 | P-1 | P-1 | P-1 |
| | | 100 | 100 | 100 | 100 | 100 | 100 | 100 | 100 | 100 |
| Acrylic copolymer (B) | | G-8 | G-9 | G-9 | G-1 | G-2 | G-1 | G-1 | G-13 | G-14 |
| | | 80 | 90 | 80 | 90 | 60 | 90 | 90 | 90 | 60 |
| Hydroxy group-containing polymer (E) | | | | | H-1 | | | H-2 | | |
| | | | | | 30 | | | 20 | | |
| Modaflow | | 0.2 | 0.2 | 0.2 | 0.2 | 0.2 | 0.2 | 0.2 | 0.2 | 0.2 |
| BTBAC | | 0.9 | 1.0 | 0.9 | 1.1 | 0.8 | 1.0 | 1.1 | 1.0 | 0.8 |
| Tinuvin 900 | | 1.8 | 2.0 | 1.8 | 2.2 | 1.6 | 2.0 | 2.2 | 2.0 | 1.6 |
| Sanol 440 | | 1.8 | 2.0 | 1.8 | 2.2 | 1.6 | 2.0 | 2.2 | 2.0 | 1.6 |
| Auxiliary curing agent | UVAN 20SE | | | | | 5 | | | | |
| | Denacol EX-212 | | | | | | 10 | | 10 | |

Notes:
*1Acrylic surface modifier by Monsanto Co.
*2Benzyltributylammonium chloride
*3Ultraviolet absorber by Ciba-Geigy Co.
*4Light stabilizer by Sankyo, KK.
*5Butylated melamine resin (solid portion: 60%) by Mitsui Toatsu Chemicals, KK.
*6Aliphatic epoxy resin (solid portion: 100%) by Nagase Chemicals, KK.

TABLE 5-continued

| | 12 | 13 | 14 | 15 | 16 | 17 | 18 | 19 | 20 | 15 | 16 |
|---|---|---|---|---|---|---|---|---|---|---|---|
| Storage stability | ○ | ○ | ○ | ○ | ○ | ⊚ | ○ | ○ | ⊚ | ○ | ○ |
| Visual appearance | ○–⊚ | ○–⊚ | ○–⊚ | ○–⊚ | ○–⊚ | ○ | ○ | ○ | ○ | ○ | ○ |
| Luster | 98 | 97 | 98 | 99 | 99 | 94 | 94 | 95 | 95 | 94 | 96 |
| Hardness | H | H | H | H | H | F | H | H | F | H | H |
| Acid resistance | ○–⊚ | ○–⊚ | ○–⊚ | ⊚ | ⊚ | ○ | ○ | ○ | ○ | ○ | ○ |
| Moisture resistance | ○–⊚ | ⊚ | ⊚ | ⊚ | ⊚ | ○ | ○ | ○ | ○ | △–○ | ○–⊚ |
| Solvent resistance | ○–⊚ | ○–⊚ | ⊚ | ⊚ | ⊚ | ○ | ○ | ○ | ○ | ○ | ○ |
| Weatherability | ⊚ | ⊚ | ⊚ | ⊚ | ⊚ | ○ | ○ | ○ | ○ | ○ | ○ |
| Non-sand recoating property | ○ | ○ | ○ | ○ | ○ | ⊚ | ○ | ○ | ⊚ | ⊚ | △–○ |
| Temperature variation crack resistance | ⊚ | ⊚ | ⊚ | ⊚ | ⊚ | ⊚ | ⊚ | ⊚ | ⊚ | ⊚ | ⊚ |
| Scratch resistance | ○–⊚ | ○–⊚ | ⊚ | ⊚ | ⊚ | ○ | ○ | ○ | ○ | ○ | ○ |
| Low-temperature curing property | ○–⊚ | ○–⊚ | ○–⊚ | ⊚ | ⊚ | ○ | ○ | ○ | ○ | ○ | ○ |

Note: Example 1–22 all employed as the base paint.

TABLE 6

| Acrylic copolymer for base | | B-2 | B-3 | B-4 | B-5 |
|---|---|---|---|---|---|
| Monomer composition (parts by weight) | methyl methacrylate | 30 | 40 | 50 | 30 |
| | ethyl acrylate | | | 30 | 45 |
| | butyl acrylate | 37 | 46.7 | | |
| | 2-hydroxyethyl acrylate | 5 | | 10 | 10 |
| | monomethyl maleate*1 | | (13.3) | | |
| | N-butoxymethyl acrylamide | 25 | | | |
| | glycidyl methacrylate | | | | 15 |
| | methacrylic acid | 3 | | 10 | |
| Solvent | n-butanol | 30 | — | 30 | 20 |
| | butyl acetate | — | 50 | — | — |
| | Solvesso #100 | 70 | 50 | 70 | 80 |
| Solution | nonvolatile content (wt %) | 50 | 50 | 50 | 50 |
| | Gardner viscosity (25° C.) | Z | V | Z | U |
| Copolymer | amide equivalents (g/eq) | 628 | — | — | — |
| | acid value (mgKOH/g) | 19.5 | 57 | 65 | — |
| | epoxy equivalents (g/eq) | — | — | — | 947 |
| | hydroxy equivalents (g/eq) | 2320 | — | 1160 | 1160 |
| | wt. average molecular wt. | 40000 | 30000 | 40000 | 30000 |

Note
*1same as note *1 for Table 1
*2Amide equivalents, acid values, epoxy equivalents and hydroxy equivalents converted to resin solid values.

TABLE 7

| | | M-2 | M-3 | M-4 | M-5 | M-6 |
|---|---|---|---|---|---|---|
| Coating composition (parts by weight) | N-alkoxyalkyl-substituted amide group-containing acrylic copolymer | B-2 100 | B-2 100 | | | B-2 100 |
| | acrylic copolymer | — | | B-3 | B-4 | B-3 |

TABLE 7-continued

| | M-2 | M-3 | M-4 | M-5 | M-6 |
|---|---|---|---|---|---|
| (C) acrylic copolymer | — | — | 20 | 20 | 33 |
| | | | B-5 | B-5 | B-5 |
| (D) acrylic copolymer | — | — | 20 | 20 | 33 |
| | | | B-1 | B-1 | |
| | | | 100 | 100 | |
| UVAN 20SE*1 | — | 9.3 | 15 | 20 | — |
| Alpaste #1700NL*2 | 11 | 12 | 18 | 18 | 18 |
| BTBAC*3 | — | — | 0.4 | 0.4 | 0.8 |
| Nacure 4054*4 | 1.0 | 1.0 | 1.2 | 1.2 | 1.6 |
| Number of coating dilution seconds*5 | 13 | 13 | 13 | 13 | 13 |

Notes:
*1Butylated melamine resin (solid portion: 60%) by Mitsui Toatsu Chemicals, KK.
*2Aluminum paste, solid content: 65% by Toyo Aluminum Co.
*3Benzyltributylammonium chloride
*4Acid catalyst (effective component: 50%) by KING Industries, Inc.
*5ethyl acetate/toluene/Solvesso #150 = 40/30/30 (weight ratio), dilution of FC #4 = 25 sec.

TABLE 8

| | | Example | | | | | |
|---|---|---|---|---|---|---|---|
| | | 21 | 22 | 23 | 24 | 25 | 26 |
| Coating | Base coating | M-1 | M-2 | M-3 | M-4 | M-5 | M-6 |
| | Clear coating*1 | 1 | 1 | 15 | 13 | 1 | 1 |
| Coating performance | Visual appearance | ○ | ⊚ | ⊚ | ⊚ | ⊚ | ⊚ |
| | Luster | 95 | 98 | 99 | 99 | 98 | 99 |
| | Hardness | F | F | H | H | H | H |
| | Acid resistance | ○ | ○–⊚ | ⊚ | ○–⊚ | ○ | ○–⊚ |
| | Moisture resistance | ○ | ○ | ⊚ | ⊚ | ○ | ○ |
| | Solvent resistance | ○ | ○ | ⊚ | ○–⊚ | ○ | ○ |
| | Weatherability | ○ | ○ | ⊚ | ⊚ | ○ | ○ |
| | Non-sand recoating property | ○ | ○ | ○ | ○ | ○ | ○ |
| | Temperature variation crack resistance | ⊚ | ⊚ | ⊚ | ⊚ | ⊚ | ⊚ |
| | Scratch resistance | ○ | ○ | ⊚ | ○–⊚ | ○ | ○ |
| | Low-temperature curing property | ○ | ○ | ⊚ | ○–⊚ | ○ | ○ |

Note
*1Example no. of clear paint used.

TABLE 9

| | | Comparative Example | | | | | | |
|---|---|---|---|---|---|---|---|---|
| | | 1 | 2 | 3 | 4 | 5 | 6 | 7 |
| Acrylic copolymer (A) | | P-12 | P-13 | P-14 | P-15 | P-16 | P-17 | P-18 |
| | | 100 | 100 | 100 | 100 | 100 | 100 | 100 |
| Acrylic copolymer (B) | | G-1 | G-1 | G-1 | G-1 | G-1 | G-1 | G-1 |
| | | 80 | 100 | 180 | 60 | 60 | 30 | 130 |
| Hydroxy group-containing polymer (E) | | | | | | | | |
| Modaflow | | 0.2 | 0.2 | 0.3 | 0.2 | 0.2 | 0.1 | 0.2 |
| BTBAC | | 0.9 | 1.0 | 1.4 | 0.8 | 0.8 | 0.7 | 1.2 |
| Tinuvin 900 | | 1.8 | 2.0 | 2.8 | 1.6 | 1.6 | 1.4 | 2.4 |
| Sanol 440 | | 1.8 | 2.0 | 2.8 | 1.6 | 1.6 | 1.4 | 2.4 |
| Auxiliary | UVAN 20SE | | | | | | | |
| | Denacol EX- | | | | | | | |

TABLE 9-continued

| | Comparative Example | | | | | | |
|---|---|---|---|---|---|---|---|
| | 8 | 9 | 10 | 11 | 12 | 13 | 14 |
| Acrylic copolymer (A) | p-19 | p-20 | p-1 | p-1 | p-1 | p-1 | p-1 |
| | 100 | 100 | 100 | 100 | 100 | 100 | 100 |
| Acrylic copolymer (B) | G-1 | G-1 | G-10 | G-11 | G-12 | G-1 | G-1 |
| | 90 | 90 | 360 | 40 | 90 | 90 | 90 |
| Hydroxy group-containing polymer (E) | | | | | | H-3 20 | H-1 80 |
| Modaflow | 0.2 | 0.2 | 0.5 | 0.1 | 0.2 | 0.2 | 0.3 |
| BTBAC | 1.0 | 1.0 | 2.3 | 0.7 | 1.0 | 1.1 | 1.4 |
| Tinuvin 900 | 2.0 | 2.0 | 4.6 | 1.4 | 2.0 | 2.2 | 2.8 |
| Sanol 440 | 2.0 | 2.0 | 4.6 | 1.4 | 2.0 | 2.2 | 2.8 |
| Auxiliary curing agent | UVAN 20SE Denacol EX-212 | | | | | | |

TABLE 10

| | | Comparative Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Storage stability | | ◉ | ◉ | X | X | ○ | ◉ | Δ | Δ | ○ | ◉ | X | ○ | ○ | ○ |
| Coating performance | Visual appearance | ○ | ○ | Δ | Δ | ○ | Δ | Δ | Δ | X | x | x | Δ | Δ | Δ |
| | Luster | 90 | 92 | 85 | 84 | 90 | 85 | 86 | 85 | 80 | 80 | 75 | 85 | 87 | 85 |
| | Hardness | HB | HB | 2H | 2H | F | 2B | H | HB | H | 3B | 2H | F | HB | B |
| | Acid resistance | Δ | Δ | ◉ | ◉ | ○ | X | ○ | Δ | ○ | X | ◉ | Δ | Δ | X |
| | Moisture resistance | ○ | ○ | Δ | Δ | ○ | Δ | X | Δ | ○ | Δ | X | ○ | X | Δ |
| | Solvent resistance | Δ | Δ | ◉ | ◉ | Δ | X | ○ | Δ | ○ | X | ◉ | Δ | ○ | Δ |
| | Weatherability | Δ | Δ | Δ | Δ | Δ | X | X | Δ | ○ | X | X | Δ | X | Δ |
| | Non-sand recoating property | ◉ | ◉ | X | X | ○ | X | X | Δ | ○ | X | X | Δ | ○ | ○ |
| | Temperature variation crack resistance | 3 | 3 | 1 | 1 | 3 | 1 | 1 | 2 | ◉ | 1 | 1 | 2 | 1 | 3 |
| | Scratch resistance | Δ | Δ | ○ | ○ | Δ | X | ◉ | Δ | ○ | X | ◉ | X | ○ | Δ |
| | Low-temperature curing property | Δ | Δ | ○ | ◉ | Δ | X | ○ | Δ | ○ | X | ◉ | X | Δ | Δ |

EXAMPLES 1–20, COMPARATIVE EXAMPLES 1–16

A zinc phosphate-treated steel plate (30 cm×90 cm) was painted with an automotive cationic electrocoating and baked at 180° C. for 30 minutes. After further coating with an aminoalkyd resin-based second coating and baking at 160° C. for 30 minutes, the coating was water sanded and dried. After first painting the coating with a base coating (M-1) to a dry thickness of 15 μm and letting it stand for 5 minutes, it was then double-coated with a clear coating listed in Table 4 or Table 9 to a dry thickness of 30 μm, by a wet-on-wet system. After letting the undried double-coated coating stand at room temperature for 15 minutes, it was baked for 30 minutes with a hot-air drier at 140° C. (the samples for evaluation of the temperature variation cracking resistance were baked at 120° C.×25 minutes), to form a multilayer coating by a 2-coat 1-bake system. The coating performance of each of the resulting multilayer coatings is shown in Tables 5 and 10.

EXAMPLES 21–26

A zinc phosphate-treated steel plate (30 cm×90 cm) was painted with an electrocoating and then the coated plate was baked, water sanded and dried, in the same manner as described above. The coating was then coated with a combination of the base coatings and clear coatings listed in Table 8 by the 2-coat 1-bake method to form a multilayer coating. The coating performance of each of the resulting multilayer coatings is shown in Table 8.

The thermosetting coating compositions according to Examples 1–20 of the invention had excellent storage stability and low-temperature curing properties, and exhibited superior coating performance.

Furthermore, by forming multilayer coatings with base coatings containing the specific thermosetting coating compositions mentioned in Examples 21–26 as essential components and clear coatings which also employ thermosetting coating compositions of the invention, it is possible to further improve the finished appearance compared to multilayer coatings which are combinations with known common base coatings. In contrast, thermosetting coating compositions of Comparative Examples 1–14 which do not fulfill the conditions specified by the invention had a lower level of storage stability, low-temperature curing properties and coating performance.

INDUSTRIAL APPLICABILITY

Thermosetting coating compositions containing acrylic copolymers according to the invention have excellent storage stability and low-temperature curing properties and their use can provide coatings with excellent coating performance; they are therefore of high industrial value.

It is claimed:

1. A thermosetting coating composition comprising an acrylic copolymer (A) containing vinyl monomer units each having an α,β-dicarboxylic acid anhydride group and vinyl monomer units each having an α,β-dicarboxylic monoester group in a total amount of 5–40 wt % and containing the vinyl monomer units with α,β-dicarboxylic acid anhydride groups at 0.3–5 wt %, and an acrylic copolymer (B) with epoxy and hydroxyl groups which has an epoxy equivalent value of 200–1,500 g/eq and a hydroxyl group equivalent value of 400–6,000 g/eq.

2. A thermosetting coating composition according to claim 1, wherein the acrylic copolymer (A) contains 10–70 wt % of (meth)acrylic acid ester monomer units with alicyclic hydrocarbon substituents.

3. A thermosetting coating composition according to claim 1 or 2, wherein the acrylic copolymer (B) contains 10–60 wt % of (meth)acrylic acid ester monomer units with alicyclic hydrocarbon substituents.

4. A thermosetting coating composition according to claim 2, wherein the (meth)acrylic acid ester monomer with alicyclic hydrocarbon substituents is cyclohexyl (meth)acrylate.

5. A thermosetting coating composition according to claim 1, wherein a methacrylic acid ester monomer unit with a hydrocarbon substituent represented by the following general formula [I] is present in acrylic copolymer (A) in an amount of 5–50 wt % and in acrylic copolymer (B) in an amount of 0–25 wt %

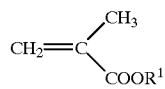

[I]

wherein $R^1$ represents a hydrocarbon group of 8–18 carbon atoms.

6. A thermosetting composition according to claim 3, wherein the (meth)acrylic acid ester monomer with alicyclic hydrocarbon substituents is cyclohexyl (meth)acrylate.

7. A thermosetting coating composition according to claim 1, wherein both acrylic copolymer (A) and acrylic copolymer (B) contain 5–25 wt % of styrene as a monomer unit.

8. A thermosetting coating composition according to claim 1, which further comprises a hydroxyl group-containing polymer (E).

9. A multilayer coating which is formed by the 2-coat 1-bake coating method wherein coating with a base coating is followed by coating with a clear coating and both are simultaneously heated to hardness, said base coating comprising a thermosetting coating composition whose major component is an amide-crosslinked acrylic copolymer with N-alkoxyalkyl-substituted amide groups as functional groups, and said clear coating containing a thermosetting coating composition according to claim 1.

10. A multilayer coating according to claim 9, wherein the base coating comprises 2 components which are an acrylic copolymer (C) containing at least 2 carboxy groups per molecule and an acrylic copolymer (D) containing at least 2 epoxy groups per molecule, the total resin solid portion of the acrylic copolymer (C) and acrylic copolymer (D) in the base paint being 10–50 wt %.

11. A method of coating a surface, comprising applying the coating composition of claim 1 to the surface.

* * * * *